United States Patent
Ennsbrunner et al.

(10) Patent No.: US 9,889,520 B2
(45) Date of Patent: Feb. 13, 2018

(54) METHOD AND APPARATUS FOR DETERMINING THE VOLTAGE AT THE ELECTRODES OF A SPOT WELDING GUN

(75) Inventors: Helmut Ennsbrunner, Leonding (AT); Thomas Gschmeidler, Scharnstein (AT)

(73) Assignee: Fronius International GmbH, Pettenbach (AT)

( * ) Notice: Subject to any disclaimer, the term of this patent is extended or adjusted under 35 U.S.C. 154(b) by 222 days.

(21) Appl. No.: 13/319,763

(22) PCT Filed: May 12, 2010

(86) PCT No.: PCT/AT2010/000164
§ 371 (c)(1),
(2), (4) Date: Nov. 10, 2011

(87) PCT Pub. No.: WO2010/129982
PCT Pub. Date: Nov. 18, 2010

(65) Prior Publication Data
US 2012/0048834 A1    Mar. 1, 2012

(30) Foreign Application Priority Data
May 14, 2009 (AT) .................. A 747/2009

(51) Int. Cl.
*B23K 11/11* (2006.01)
*B23K 11/25* (2006.01)

(52) U.S. Cl.
CPC ........... *B23K 11/258* (2013.01); *B23K 11/115* (2013.01)

(58) Field of Classification Search
CPC .. B23K 26/20; B23K 10/006; B23K 15/0046; B23K 11/257; G01R 27/02; G01R 27/08;
(Continued)

(56) References Cited

U.S. PATENT DOCUMENTS 2,370,009 A * 2/1945 Clark et al. .................... 219/110
2,486,552 A * 11/1949 Callender ..................... 219/110
(Continued)

FOREIGN PATENT DOCUMENTS

| DE | 31 29 170 | 3/1982 |
| EP | 0 345 473 | 12/1989 |
| JP | 2008-142773 | 6/2008 |

OTHER PUBLICATIONS

International Search Report of PCT/AT2010/000164, dated Sep. 1, 2010.
(Continued)

*Primary Examiner* — Eric Stapleton
(74) *Attorney, Agent, or Firm* — Collard & Roe, P.C.

(57) ABSTRACT

A method and an apparatus for determining the temporal curve of the voltage ($u_e(t)$) at the electrodes (3) of a spot welding gun (1) during a spot welding process as an indicator of the welding quality, wherein the electrodes (3) are fastened to gun arms (2) that can be moved relative to each other are provided. The apparatus includes a device (9) for measuring a measuring voltage ($u_m(t)$) between the electrodes (3), that measuring device (9) being connected to measuring leads (6) extending along the gun arms (2), and further includes a compensating coil (7) for measuring a compensating voltage ($u_k(t)$) for compensating measuring errors within measuring leads. In order to determine the temporal curve of the voltage ($u_e(t)$) at the electrodes (3) of the spot welding gun (1) during a spot welding process as precisely as possible, the device (9) for measuring the measuring voltage ($u_m(t)$) and the device (10) for measuring the compensating voltage ($u_k(t)$) are designed as separate units for separate detection and are connected to a device (11) for processing the detected values.

5 Claims, 4 Drawing Sheets

(58) Field of Classification Search
CPC .... G01R 27/14; G01R 19/00; G01R 19/0084; G01R 21/06
USPC ....... 219/91.1, 109, 110, 117.1, 118, 121.14, 219/121.46, 121.64, 121.83, 121.85; 700/32–34, 108–111, 166; 702/65, 66, 702/81–84; 73/850

See application file for complete search history.

(56) References Cited

U.S. PATENT DOCUMENTS

| | | | |
|---|---|---|---|
| 2,508,330 A * | 5/1950 | Callender et al. | 219/110 |
| 3,068,350 A * | 12/1962 | Archer | 219/110 |
| 3,389,239 A * | 6/1968 | Treppa et al. | 219/110 |
| 3,445,768 A * | 5/1969 | Ferguson | 324/142 |
| 3,582,967 A * | 6/1971 | Beckman et al. | 219/109 |
| 3,586,815 A * | 6/1971 | Van Eijnsbergen et al. | 219/90 |
| 3,609,285 A * | 9/1971 | Scarpelli et al. | 219/109 |
| 3,746,829 A * | 7/1973 | Petzold | 219/110 |
| 3,921,453 A * | 11/1975 | Platzer, Jr. | 374/181 |
| 4,242,561 A * | 12/1980 | Long | 219/109 |
| 4,302,653 A * | 11/1981 | Denning et al. | 219/110 |
| 4,334,779 A * | 6/1982 | Domey et al. | 356/496 |
| 4,376,884 A * | 3/1983 | Gold et al. | 219/109 |
| 4,403,132 A * | 9/1983 | Sugimoto | 219/109 |
| 4,434,351 A * | 2/1984 | Nakata et al. | 219/117.1 |
| 4,447,698 A * | 5/1984 | Van Sikle et al. | 219/110 |
| 4,447,700 A * | 5/1984 | Cohen | 219/117.1 |
| 4,449,028 A * | 5/1984 | Buxton | 219/109 |
| 4,456,810 A * | 6/1984 | Schumacher et al. | 219/110 |
| 4,459,457 A * | 7/1984 | Jurek | 219/109 |
| 4,562,330 A * | 12/1985 | Hamilton | 219/110 |
| 4,621,176 A * | 11/1986 | Kliesch et al. | 219/608 |
| 4,714,816 A * | 12/1987 | Pazzaglia | 219/109 |
| 4,734,556 A * | 3/1988 | Namiki | 219/110 |
| 4,734,640 A * | 3/1988 | Kitahori et al. | 324/127 |
| 4,745,255 A * | 5/1988 | Mettier | 219/110 |
| 4,887,025 A * | 12/1989 | Re Fiorentin et al. | 324/693 |
| 4,939,335 A * | 7/1990 | Mueller | 219/109 |
| 4,963,830 A * | 10/1990 | Roth et al. | 324/715 |
| 5,015,815 A * | 5/1991 | Matuschek et al. | 219/110 |
| 5,043,557 A * | 8/1991 | Tabata et al. | 219/130.51 |
| 5,081,338 A * | 1/1992 | Dufrenne | 219/109 |
| 5,171,961 A * | 12/1992 | Corton et al. | 219/109 |
| 5,291,423 A * | 3/1994 | Roosli | 702/82 |
| 5,313,041 A * | 5/1994 | Levy et al. | 219/109 |
| 5,343,011 A * | 8/1994 | Fujii et al. | 219/109 |
| 5,386,096 A * | 1/1995 | Buda et al. | 219/110 |
| 5,436,422 A * | 7/1995 | Nishiwaki et al. | 219/110 |
| 5,449,877 A * | 9/1995 | Buda et al. | 219/110 |
| 5,575,934 A * | 11/1996 | Takakuwa et al. | 219/109 |
| 5,764,859 A * | 6/1998 | Kim et al. | 706/20 |
| 5,786,558 A * | 7/1998 | Shimada | 219/110 |
| 5,793,011 A * | 8/1998 | Watanabe et al. | 219/109 |
| 5,852,273 A * | 12/1998 | Ryudo et al. | 219/110 |
| 5,892,197 A * | 4/1999 | Goto et al. | 219/110 |
| 5,925,264 A * | 7/1999 | Mouannes | 219/110 |
| 5,942,139 A * | 8/1999 | Moriguchi et al. | 219/130.33 |
| 5,963,022 A * | 10/1999 | Buda et al. | 323/212 |
| 6,013,892 A * | 1/2000 | Buda et al. | 219/110 |
| 6,043,449 A * | 3/2000 | Kanjo | 219/109 |
| 6,057,523 A * | 5/2000 | Fujii et al. | 219/110 |
| 6,087,613 A * | 7/2000 | Buda et al. | 219/110 |
| 6,130,396 A * | 10/2000 | Hasegawa et al. | 219/110 |
| 6,140,825 A * | 10/2000 | Fujii et al. | 324/718 |
| 6,329,626 B1 * | 12/2001 | Fujita et al. | 219/87 |
| 6,335,504 B1 * | 1/2002 | Ling et al. | 219/109 |
| 6,359,258 B1 * | 3/2002 | Blankenship et al. | 219/130.01 |
| RE37,799 E * | 7/2002 | Watanabe et al. | 219/109 |
| 6,479,784 B1 * | 11/2002 | Tagliavini | 219/109 |
| 6,506,997 B2 * | 1/2003 | Matsuyama | 219/110 |
| 6,520,026 B1 * | 2/2003 | Anderson et al. | 73/827 |
| 6,710,297 B1 * | 3/2004 | Artelsmair et al. | 219/130.01 |
| 6,747,235 B2 * | 6/2004 | Muller et al. | 219/64 |
| 6,766,283 B1 * | 7/2004 | Goldman et al. | 703/2 |
| 7,015,419 B2 * | 3/2006 | Hackl et al. | 219/130.21 |
| 7,173,209 B2 * | 2/2007 | Muller et al. | 219/64 |
| 7,244,905 B2 * | 7/2007 | Das et al. | 219/109 |
| 7,335,854 B2 * | 2/2008 | Hutchison | 219/137.71 |
| 7,432,466 B2 * | 10/2008 | Spinella et al. | 219/110 |
| 7,640,125 B2 * | 12/2009 | D'Angelo et al. | 702/81 |
| 7,683,290 B2 * | 3/2010 | Daniel et al. | 219/130.01 |
| 7,718,918 B2 * | 5/2010 | Spinella et al. | 219/110 |
| 7,728,254 B2 * | 6/2010 | D'Angelo et al. | 219/121.62 |
| 7,759,596 B2 * | 7/2010 | Filev et al. | 219/110 |
| 8,256,296 B2 * | 9/2012 | Ume et al. | 73/627 |
| 2002/0053555 A1 * | 5/2002 | Matsuyama | 219/110 |
| 2005/0218120 A1 * | 10/2005 | Shih | 219/110 |

OTHER PUBLICATIONS

Austrian Patent Office Preliminary Office Action dated Jan. 28, 2010 in Austrian Application No. A 747/2009 (with English translation of relevant parts).

* cited by examiner

METHOD AND APPARATUS FOR DETERMINING THE VOLTAGE AT THE ELECTRODES OF A SPOT WELDING GUN

CROSS REFERENCE TO RELATED APPLICATIONS

This application is the National Stage of PCT/AT2010/000164 filed on May 12, 2010, which claims priority under 35 U.S.C. § 119 of Austrian Application No. A 747/2009 filed on May 14, 2009, the disclosure of which is incorporated by reference. The international application under PCT article 21(2) was not published in English.

The invention relates to a method for determining the temporal curve of the voltage at the electrodes of a spot welding gun during a spot welding process as an indicator of the welding quality, wherein the electrodes are fastened to gun arms, that can be moved relative to each other, wherein a measuring voltage is measured via measuring leads and an induced compensating voltage is measured by means of a compensating coil.

The invention also relates to an apparatus for determining the temporal curve of the voltage at the electrodes of a spot welding gun during a spot welding process as an indicator of the welding quality, wherein the electrodes are fastened to gun arms, that can be moved relative to each other, comprising a device for measuring a measuring voltage between the electrodes, said measuring device being connected to measuring leads extending along the gun arms, and further comprising a compensating coil for measuring a compensating voltage for compensating measuring errors in the measuring leads.

In resistance welding processes using spot welding guns at least two components to be welded are contacted, and by impressing a welding current via the electrodes of the spot welding gun the components are melted on and thereby a weld joint is created. For quality control purposes, but also for controlling the welding current course, a continued detection of the welding current and the electrode voltage during the spot welding process is required.

Usually, the quality-related electrode voltage, resulting from the temporally changing ohmic resistance R(t) of the components and the welding current i(t), is significantly determined via measuring leads running in parallel to feed and return lines for the welding current. By such a measuring arrangement an induction loop is formed by the feed lines and the measuring leads, in which voltages are induced by magnetic fields existing during the spot welding process, falsifying the measuring result. Often, the changes in the magnetic field are so large that the induced voltage is even larger than the electrode voltage to be measured.

In order to suppress the induction portions in the measuring signal often analog and digital filters are used. It is disadvantageous that not only the induction portion is suppressed, but also the temporal curve of the electrode voltage R(t)*i(t) is falsified.

In order to compensate the induced voltages, compensating coils are employed, thereby reducing or eliminating impacts of magnetic fields. For example, in the spot welding machine according to DE 31 29 170 A1 a compensating coil is interconnected with the coil formed of the measuring leads and the welding current feed lines such that errors due to the induced voltages can be compensated approximately. It is disadvantageous that the changes of the magnetic flux can not be corrected. Such changes within the magnetic field are caused e.g. by moving the gun relative to the component from welding spot to welding spot or are created during the welding process by saturation occurrences of component materials located in the magnetic field of the gun. Thus, these changes occur virtually always so that said errors are irregular.

Furthermore, in measuring processes, the voltage measuring leads whereof are not contacted in the range of the electrodes, measured voltages are affected by temperatures existing at the gun arms and the feed and return lines for the welding current. This is because the temperature affects the resistance of the feed line and, thus, the voltage drop so that the measuring result is falsified.

The object of the present invention is to provide a method and apparatus mentioned above, by the help of which the temporal curve of the voltage at the electrodes of the spot welding gun during a spot welding process can be determined as precisely as possible. Prior art disadvantages are to be avoided or at least be reduced.

In procedural terms, the object of the invention is solved in that the measuring voltage and the compensating voltage are detected separately and that the relation between the measuring voltage and the compensating voltage is determined. In contrast to prior art the present method allows for a separate processing of the measuring voltage and the compensating voltage, whereby induced voltages can be compensated independently of the changing magnetic flux, and the electrode voltage can be determined precisely. In turn, the precisely determined electrode voltage allows for the welding quality to be concluded in an improved way. The present method is characterized in that during the entire spot welding process the measuring voltage and the compensating voltage can be determined and thereby a continuous correction of measuring errors caused by induced voltages becomes possible.

According to another feature of the invention it is intended that the relation between measuring voltage and compensating voltage during the spot welding process is determined continuously so that a precise measurement is provided.

According to an advantageous variation of the method said relation between measuring voltage and compensating voltage is determined at times, when erratic changes in voltage occur. Since at those times, when quick voltage changes occur within the compensating coil also quick voltage changes must occur within the measuring voltage signal, the magnitude of induced voltage can, thus, be particularly well concluded by comparing the measuring voltage and the compensating voltage.

According to a further feature of the invention it is intended that the compensating voltage is multiplied by the determined relation and subtracted from the measuring voltage for determining the electrode voltage. Thus, the electrode voltage can be determined very precisely without falsification caused by filtering and changing magnetic fluxes during the welding and from welding spot to welding spot due to the elimination of induced voltages.

In addition, the voltage drop at the resistance of feed lines can be subtracted from the measuring voltage adjusted by the induced voltages for determining the electrode voltage. This way, further influencing factors can be eliminated and the electrode voltage can be determined more precise.

The voltage drop at the resistance of feed lines can be determined by the help of the ohmic resistance of feed lines during a spot welding process without using the components to be welded. Thus, a spot welding process without components to be welded is performed prior to the actual spot welding process, and the measuring voltage adjusted by the induced voltage is divided by the measured welding current, thereby the ohmic resistance of feed lines is determined. Thus, an accurate correction of the feed line resistance at the gun body, which changes depending on temperature, can be performed.

Advantageously, the measuring voltage and the compensating voltage are digitalized and delivered to a processing unit, particularly a microprocessor.

Advantageously, a part of the area defined by the measuring leads for measuring the measuring voltage is covered by the compensating coil for measuring the compensating voltage. The compensating coil is advantageously arranged such that the accessibility to the components to be welded is preferably not impaired. This way it is also ensured that the induced voltages within the measuring lead and within the compensating coil do not differ from each other in their form due to external magnetic fields, such as by welding currents of adjacent welding guns, during the spot welding process, and, thus, a compensation of the induction portion within the measuring voltage can take place.

In particular, for quality control purposes it is of advantage when the determined measuring voltage and compensating voltage and/or magnitudes derived therefrom are stored.

The object of the invention is also solved by an apparatus for determining the temporal curve of the voltage at the electrodes of a spot welding gun mentioned above, wherein the device for measuring the measuring voltage and the device for measuring the compensating voltage are designed as separate units for separate detection and connected to a device for processing the detected values. As already mentioned above, by separate detection and processing of measuring voltage and compensating voltage the electrode voltage can be determined preferably precise without falsifying the temporal curve by means of filtering in a changing magnetic flux due to the accurate compensation of the induced voltage within the measuring voltage continuously updated. Another advantage is that the processing device and the measuring devices are accommodated within a measuring apparatus mounted close to the welding gun, e.g. at the gun body. Thus, interferences can be minimized. Advantageously, the measuring data is edited in the processing unit and made available to other system parts via a bus system.

As an advantage, the compensating coil covers a part of the area defined by the measuring leads, without, however, significantly impairing the accessibility of the components to be welded.

If the presence of temporarily changing external magnetic fields can be excluded, it is also possible to use a Rogowski coil as compensating coil. A Rogowski coil is an air-core coil without a ferrite core, which is arranged around a gun component conducting the welding current, whereby nonlinear impacts of a ferrite core will no longer occur. Advantageously, the Rogowski coil can simultaneously be used for the determination of the welding current and for the determination of the induction voltage for compensation, whereby system costs can be lowered.

According to another feature of the invention it is provided that the processing device is designed for detecting the measuring voltage and the compensating voltage and for determining a relation between the measuring voltage and the compensating voltage, and that the relation can be determined from the values detected at those times, when erratic voltage changes occur. Said relation is determined from values detected at those times, when erratic changes occur. Thus, in comparing the measuring voltage and the compensating voltage at those times, when erratic voltage changes occur, the portion of the induced voltages in the measuring voltage during the entire welding period can be eliminated.

Advantageously, the processing device is designed for multiplication of the compensating voltage by the relation determined and for subtraction of the compensating voltage multiplied by relation from the measuring voltage, in order to determine the electrode voltage.

Also, a memory for storing the detected measuring voltage, the compensating voltage and/or magnitudes derived therefrom can be provided.

Finally, according to an advantageous variation of the apparatus the measuring leads are significantly fastened in front of the electrodes, whereby the voltage drop occurring at the electrodes is independent from variations in temperature. Usually, the electrodes are water-cooled, whereby the temperature of said cooled part of the feed line changes merely noticeable and, thus, in operation the predefined feed line resistance can be taken into account properly. Moreover, the electrode change, continuously taking place during operation, is thereby not impaired.

The present invention is explained in more detail with the help of the attached drawings. In which.

Figure 1:
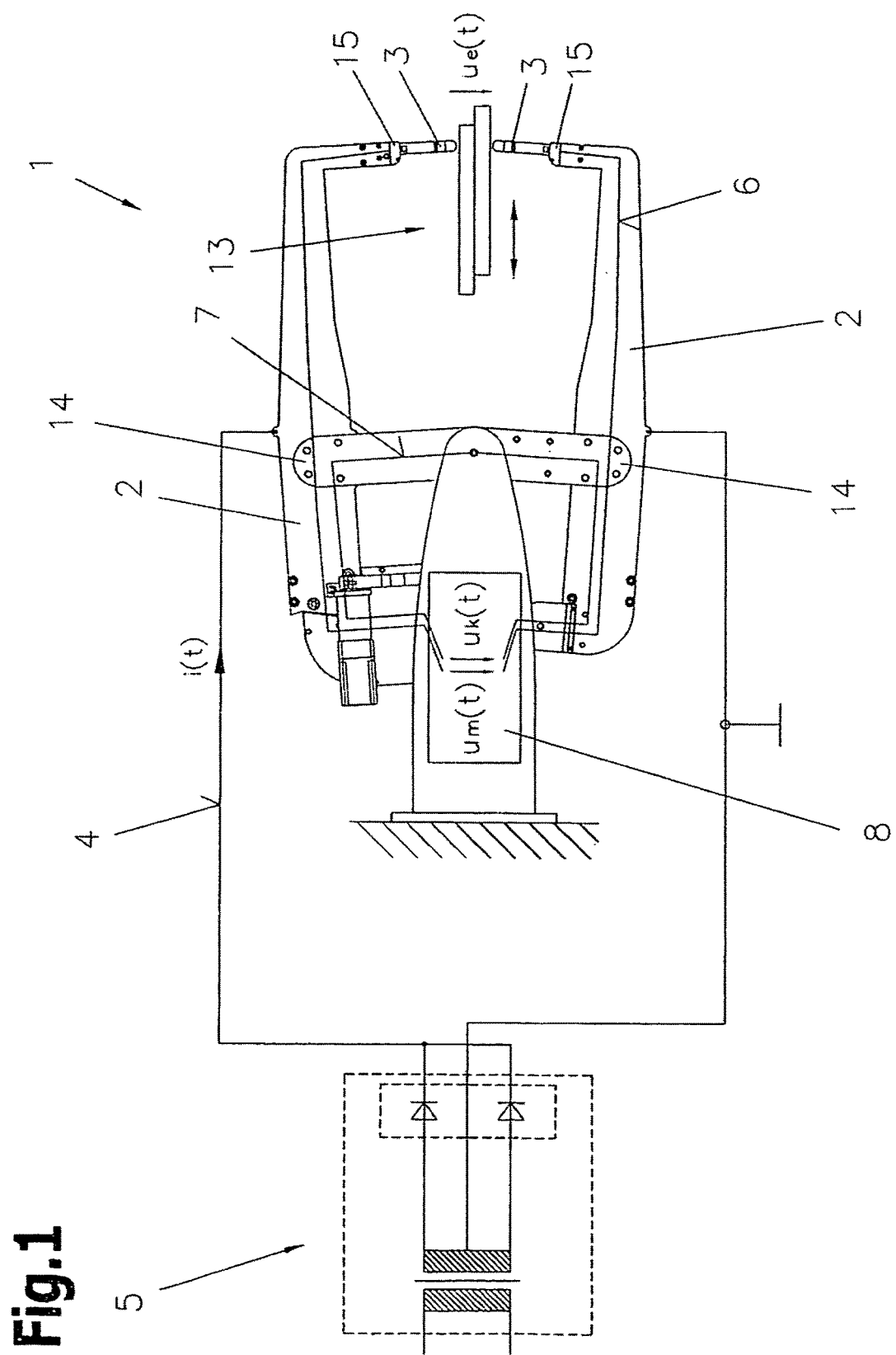
FIG. 1 shows a schematic block diagram of a spot welding gun comprising a device for determining the temporal curve of the voltage at the electrodes.

FIG. 1 schematically shows a spot welding gun 1 comprising gun arms 2 that can be moved relative to each other and electrodes 3 fastened thereto. Via appropriate feed lines 4 as well as preferably via said gun arms 2 the welding current i(t) generated in a current source 5 is conducted to the electrodes 3. During a spot welding process the components 13 to be welded are compressed by electrodes 3 and melted by welding current i(t) so that a welding spot is created. For determining the temporal curve of voltage $u_e(t)$ between the electrodes 3 of spot welding gun 1 during a spot welding process a measuring voltage $u_m(t)$ is measured via measuring leads 6. Said measuring leads 6 are preferably guided along the entire gun arms 2 and connected to a measuring device 8 arranged on the spot welding gun 1. Though, a voltage $u_i(t)$ is induced in the measuring leads 6 in particular by the flowing welding current i(t), and the measuring result is falsified. Additionally, the induced voltage $u_i(t)$ is affected by the component 13. For compensating said induced voltage $u_i(t)$, superimposed to measuring voltage $u_m(t)$, a compensating coil 7 is arranged, preferably over a part of the coil formed of measuring leads 6 and electrodes 3 for providing a magnetical coupling of coils. Within compensating coil 7 a voltage is only induced by welding current i(t) flowing during the spot welding process, which is measured as compensating voltage $u_k(t)$. Preferably, compensating coil 7 is guided over a portion of the gun arms 2 and the swivel arms 14 so that the accessibility of spot welding gun 1 is not impaired. It is essential that within the appropriate measuring device 8 measuring voltage $u_m(t)$ and compensating voltage $u_k(t)$ are detected and processed independently of one another. Thus, on the basis of the compensating voltage $u_k(t)$ the voltage $u_i(t)$ induced in the measuring voltage $u_m(t)$ can be determined so that electrode voltage $u_e(t)$ can be determined precisely.

Figure 2:
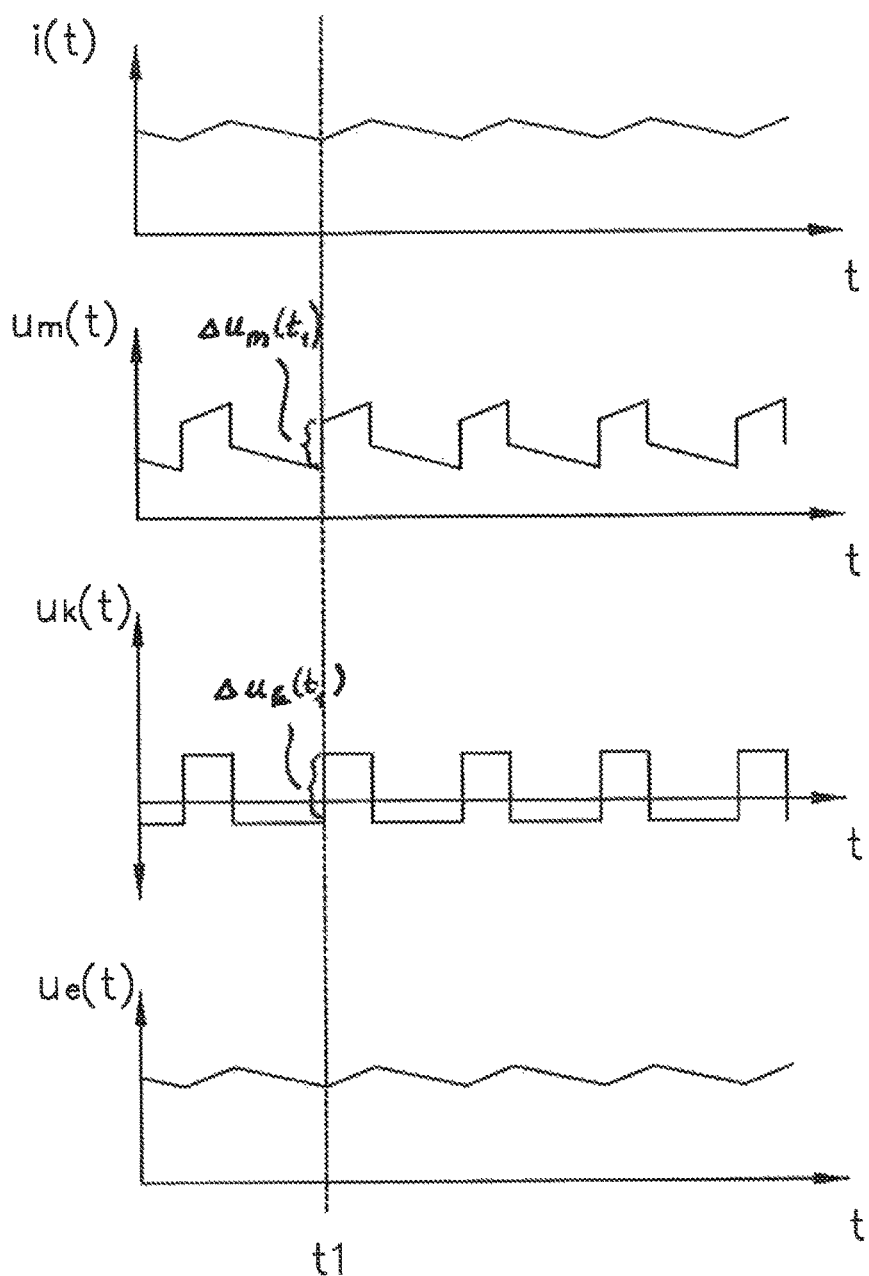
FIG. 2 shows the temporal curves of the welding current, measuring voltage, compensating voltage and the electrode voltage determined therefrom during a spot welding process.

By means of the temporal curves of welding current i(t), measuring voltage $u_m(t)$ and compensating voltage $u_k(t)$ at a medium frequency direct current station shown in FIG. 2, the present method for determining the temporal curve of the electrode voltage $u_e(t)$ during a spot welding process in a medium frequency system can be explained. The welding current i(t) flows from current source 5 to electrodes 3 via feed lines 4 and gun arms 2 into an ohmic inductive circuit and is, for this reason, not erratic. The portions of welding current i(t) having a positive and a negative rise are generated by appropriate actuating of the welding transformer within current source 5. Instead of real curves in the form of e-potentials the positive and negative rises of the welding current i(t) are approximated by straight lines within the drawing. Furthermore, finite rises of erratic signal portions were approximated by verticals.

Measuring voltage $u_m(t)$ consists of the induced voltage $u_i(t)$ and electrode voltage $u_e(t)$. The induced voltage $u_i(t)$ is affected by component 13 to be welded, since component 13 is moved into the coil formed of measuring leads 6 and changes the magnetic flux of the coil. It is to be noted that the position of component 13 is changed with every welding spot as indicated by the arrow in FIG. 1.

In contrast to measuring voltage $u_m(t)$ the voltage curve $u_k(t)$ at compensating coil 7 is proportional to the discharge of welding current i(t), since component 13 has no impact on the magnetic flux within compensating coil 7. Erratic changes in the curve of compensating voltage $u_k(t)$ and measuring voltage $u_m(t)$ relate to the breaks of slope in the curve of welding current i(t).

By comparing the measuring voltage $u_m(t)$ and the compensating voltage $u_k(t)$ in the range of erratic voltage changes, for example at time point ti, the measuring device 8 can determine a relation v(t) based on the step sizes of the voltage changes. Said relation v(t) is necessary to balance the irregular areas of measuring coil and compensating coil 7 and to conclude from compensating voltage $u_k(t)$ to induced voltage $u_i(t)$. If the compensating voltage $u_k(t)$ is multiplied by said determined relation v(t) and subtracted from measuring voltage $u_m(t)$, then significantly, the electrode voltage ue(t) is precisely obtained. Thus, the induced voltage $u_i(t)$ is eliminated from the measuring voltage $u_m(t)$. Additionally, a voltage drop $u_L(t)$ is still to be subtracted from said electrode voltage $u_e(t)$ due to the resistance of feed lines 4. This is necessary since the measuring leads 6 can not be guided to those positions of the electrodes 3 that produce the welding spot. Accordingly, the electrodes 3 need to be changed regularly. For this reason, measuring leads 6 were significantly fastened to the so-called electrode socket 15, each receiving one electrode 3. That means that in this case the voltage drop $u_L(t)$ at electrodes 3—being a resistance and also feed line 4—is also measured. In order to subtract said voltage drop $u_L(t)$, it is necessary to determine the value of the ohmic resistance during a spot welding process, without, however, the components to be welded. For that purpose, a spot welding process is significantly performed, wherein electrodes 3 contact each other, since no components are present. Thus, the voltage drop $u_L(t)$ is obtained by subtracting the compensating voltage $u_k(t)$ from the measured voltage $u_m(t)$. Said voltage drop $u_L(t)$ does not change any further significantly, since the measuring leads 6 are fastened to electrode sockets 15—that is in front of the water-cooled electrodes 3. The temperature of the electrodes 3 is thereby remained substantially stable so there is no impact on the voltage drop $u_L(t)$. Thus, the minor voltage drop $u_L(t)$ that is finally still contained within electrode voltage $u_e(t)$ can be subtracted and electrode voltage $u_e(t)$ is determined precisely. Thereby, the welding spot quality can be evaluated very precisely on the basis of electrode voltage $u_e(t)$.

In order to determine electrode voltage $u_e(t)$ continuously, it is necessary to update or redetermine the relation v(t) with every erratic voltage change. For example, erratic voltage changes take place at a frequency in the range of up to 10 kHz, for example 2 kHz. Between erratic voltage changes the electrode voltage $u_e(t)$ is determined by means of the relation v(t) determined at the last erratic change. According to this, significantly an approximation of electrode voltage $u_e(t)$ takes place between the erratic voltage changes. Thus, a permanent elimination of the voltages $u_i(t)$ induced within measuring voltage $u_m(t)$ is ensured. The present method is not impaired by external magnetic fields from the surroundings of a spot welding gun 1, since both measuring voltage $u_m(t)$ and compensating voltage $u_k(t)$ are changed similarly.

Figure 3:
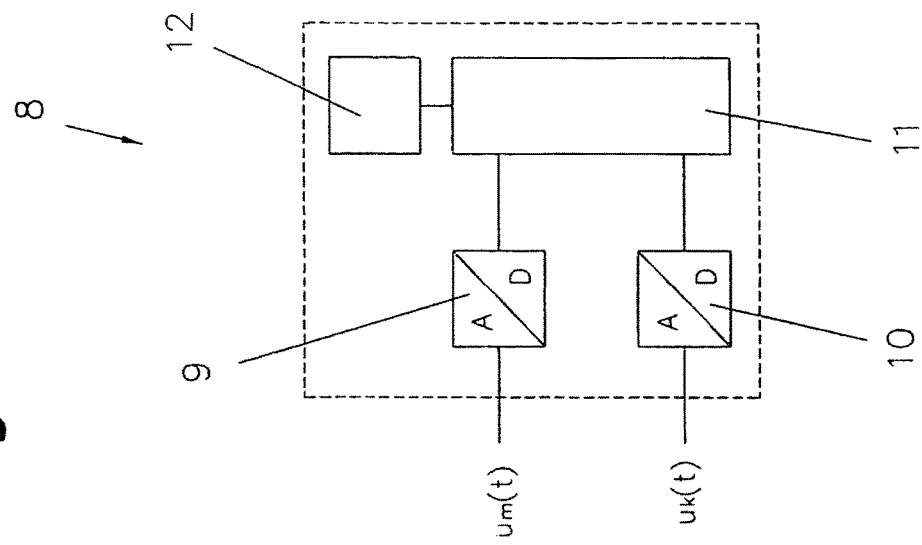
FIG. 3 shows a block diagram of a possible embodiment of a device for determining the temporal curve of the electrode voltage of a spot welding gun.
Figure 2:
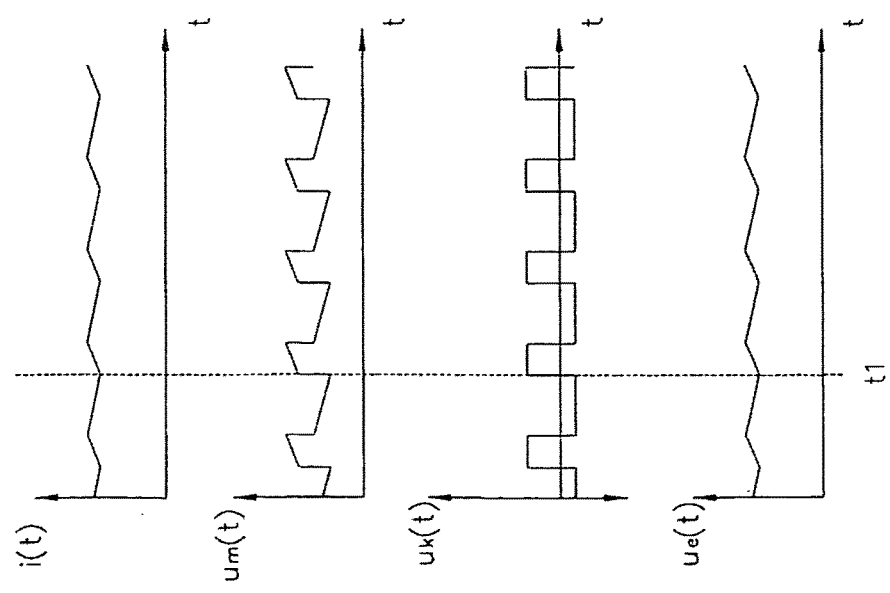

Finally, FIG. 3 shows a block diagram of a possible measuring device 8 for determining the temporal curve of the voltage $u_e(t)$ at the electrodes of a spot welding gun, comprising a device 9 for measuring the measuring voltage $u_m(t)$ and a device 10 for measuring the compensating voltage $u_k(t)$. Both measuring devices 9, 10 are preferably formed by analog-digital converters. Thus, the digitalized values of measuring voltage $u_m(t)$ and compensating voltage $u_k(t)$ are supplied to a processing device 11, particularly a microprocessor or a field programmable gate array (FPGA), where a processing of measuring signals and a determination of electrode voltage $u_e(t)$ is performed according to the present method. In addition, the processing device 11 can be provided with a memory 12 for storing the detected measuring voltage $u_m(t)$ and the compensating voltage $u_k(t)$ or the magnitudes processed from measuring voltage $u_m(t)$ and compensating voltage $u_k(t)$. Preferably, also measuring device 8 is fastened to gun body (FIG. 1) and connected to further system parts of spot welding gun 1 via a bus system. Thus, the digitalization of analog voltages takes place directly at gun body within measuring device 8. To improve quality assurance a real-time capable bus system is preferred to be employed.

Figure 4:
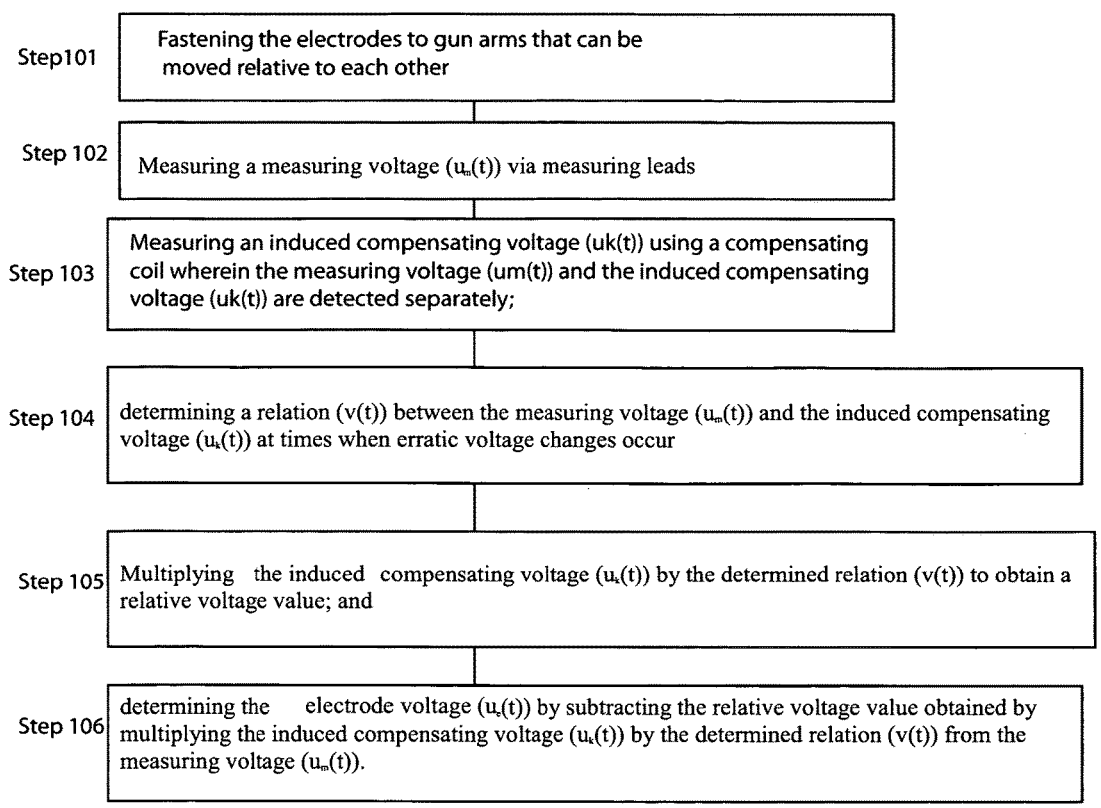
FIG. 4 is a flow chart of a method for determining a temporal curve of a voltage (u.(t)) at the electrodes of a spot welding gun during a spot welding process as an indicator of welding quality.

FIG. 4 is a flow chart of a method for determining a temporal curve of a voltage (u.(t)) at the electrodes of a spot welding gun during a spot welding process as an indicator of welding quality. The method starts in step 101 wherein this step includes fastening the electrodes to gun arms that can be moved relative to each other. Next, step 102 comprises the step of measuring a measuring voltage ($u_m(t)$) via measuring leads. Next, step 103 comprises measuring an induced compensating voltage (uk(t)) using a compensating coil wherein the measuring voltage (um(t)) and the induced compensating voltage (uk(t)) are detected separately. Next, step 104 comprises the step of determining a relation (v(t)) between the measuring voltage ($u_m(t)$) and the induced compensating voltage ($u_k(t)$) at times when erratic voltage changes occur. Next, step 105 comprises multiplying the induced compensating voltage ($u_k(t)$) by the determined relation (v(t)) to obtain a relative voltage value. Next, step 106 comprises determining the electrode voltage ($u_e(t)$) by subtracting the relative voltage value obtained by multiplying the induced compensating voltage ($u_k(t)$) by the determined relation (v(t)) from the measuring voltage ($u_m(t)$). These steps then make it possible to determine the weld quality of a weld.

Accordingly, while at least one embodiment has been shown and described, the embodiments are shown as examples only and the following claims are not to be limited to the embodiments disclosed herein.

The invention claimed is:

1. A method for determining a temporal curve of a voltage ($u_e(t)$) at the electrodes of a spot welding gun during a spot welding process as an indicator of welding quality, the method comprising the steps of:
   a) fastening the electrodes to gun arms that can be moved relative to each other;
   b) measuring a measuring voltage ($u_m(t)$) via measuring leads;
   c) measuring a compensating voltage ($u_k(t)$) using a compensating coil;
   wherein the measuring voltage ($u_m(t)$) and the compensating voltage ($u_k(t)$) are detected separately and at least one of the measuring voltage and the compensating voltage are detected at a frequency of between 2 kHz and 10 kHz;
   d) determining a relation ($v(t)$) between the measuring voltage ($u_m(t)$) and the compensating voltage ($u_k(t)$) at times when erratic voltage changes occur;
   e) multiplying said compensating voltage ($u_k(t)$) by the determined relation ($v(t)$) to obtain a relative voltage value; and
   f) determining the electrode voltage ($u_e(t)$) by subtracting the relative voltage value obtained by multiplying the compensating voltage ($u_k(t)$) by the determined relation ($v(t)$) from the measuring voltage ($u_m(t)$);
   digitizing at least one voltage reading on at least one gun body;
   wherein the relation ($v(t)$) is continuously determined during the spot welding process; and
   wherein a part of an area defined by the measuring leads is covered by the compensating coil.

2. The method according to claim 1, wherein a voltage drop ($u_L(t)$) at a resistance of feed lines is subtracted from the measuring voltage ($u_m(t)$) adjusted by an induced voltage ($u_i(t)$) for determining the electrode voltage ($u_e(t)$).

3. The method according to claim 2, wherein an ohmic resistance of feed lines for determining a voltage drop ($u_L(t)$) during a spot welding process is previously determined without components to be welded.

4. The method according to claim 1, wherein the measuring voltage ($u_m(t)$) and the compensating voltage ($u_k(t)$) are digitalized separately on said gun body and are supplied to a processing device on said gun body.

5. The method according to claim 1, wherein the measuring voltage ($u_m(t)$) and the compensating voltage ($u_k(t)$) and/or magnitudes derived therefrom are stored.

* * * * *